United States Patent Office 3,666,419
Patented May 30, 1972

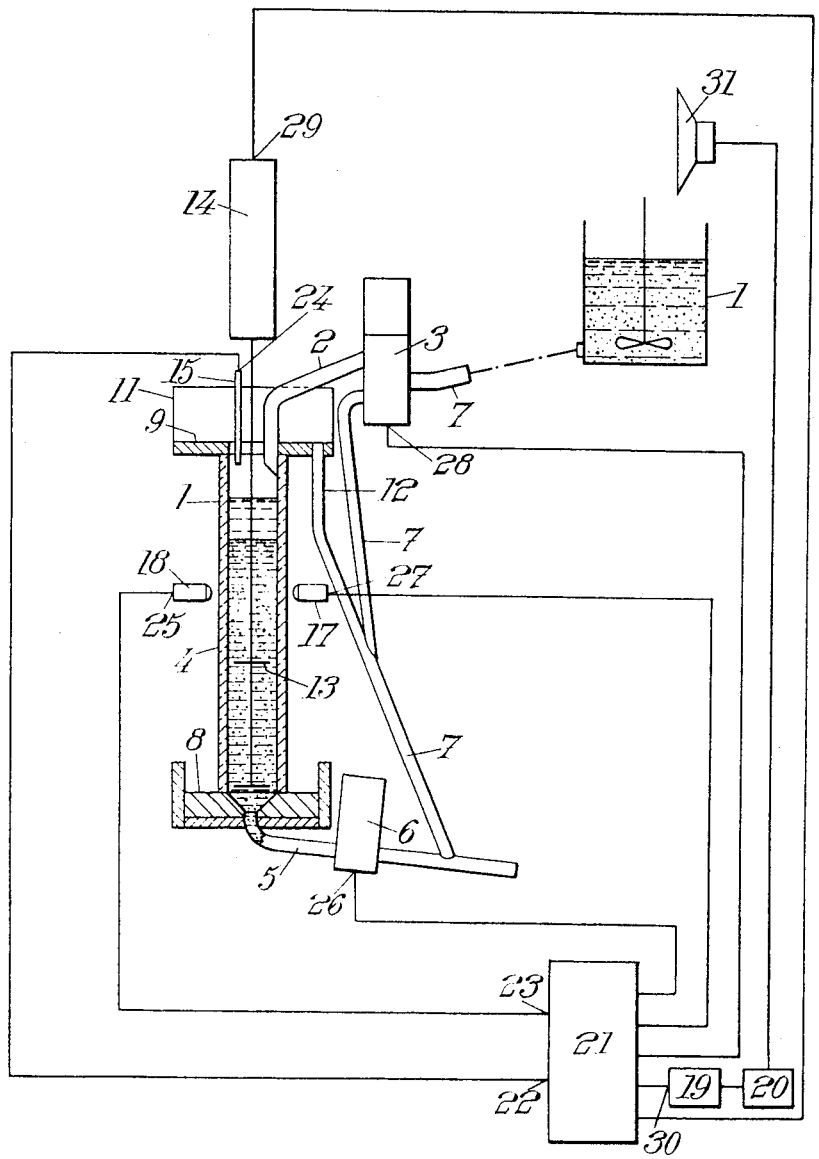

3,666,419
METHOD AND APPARATUS FOR AUTOMATI-
CALLY CONTROLLING THE RATE OF SET-
TLEMENT OF A SOLID IN SUSPENSION IN A
LIQUID
Paul Cahour, Seyssinet, and Jean Decrop, Jean Holder,
and Alain Ledac, Grenoble, France, assignors to Com-
missariat a l'Energie Atomique, Paris, France
Filed Oct. 21, 1968, Ser. No. 769,120
Claims priority, application France, Oct. 24, 1967,
125,669
Int. Cl. G01n 15/04, 11/00
U.S. Cl. 23—230
10 Claims

ABSTRACT OF THE DISCLOSURE

Method and device for automatically controlling the rate of settlement of a solid in suspension in a liquid medium, in particular of a precipitate formed in the liquid medium, as a consequence of a continuous chemical reaction. Parts of the suspension are periodically drawn off from said medium and delivered to a settlement cell to be subjected to a cycle of operations which comprises stopping the above delivery when the suspension has reached a set level in the cell, measuring the settling time of the interface of the precipitate and of the supernatant liquid which forms in the suspension at rest, between an upper set level and a lower set level in said cell, and discharging of the suspension from the cell.

---

The present invention relates to methods and devices for automatically controlling the rate of settlement of a solid in suspension in a liquid, and more particularly though not exclusively, to means for automatically controlling the rate of settlement of precipitates formed during a chemical reaction in the midst of a liquid medium.

It is indeed known, notably in the last mentioned case, that the rates of settlement of the precipitates formed can vary within very wide limits, that in a given medium these rates of settlement are tied to the physicochemical characteristics of the precipitates (area, grain size, etc.), and that these characteristics are usually closely dependent upon the conditions under which the precipitates were obtained (pH value, the respective reactant throughputs, temperature, etc.).

It has been noted for example, during the manufacture of sinterable uranium dioxide from ammonium uranate obtained by precipitation by bringing together solutions of uranyl nitrate and ammonia, that it was of crucial importance to maintain the rates of settlement of the suspension of ammonium uranate in its mother liquors within clearly specified limits in order to ensure consistently regular subsequent filtering, calcining and reducing operations for the purpose of producing sinterable uranium dioxide of uniform quality.

It is the primary object of the present invention to provide a method and a device for continuously controlling the rate of settlement of a precipitate in the midst of a liquid medium, which method and device permit such measurements to be made simply and rapidly, allow controlling to be effected with great ease, and which may be adapted to the automatic control of the conditions of precipitation of a substance during a continuous production process.

The subject method of this invention consists mainly in periodically carrying out a cycle of operations which includes the successive steps of drawing off, preferably while effecting agitation, a part of the suspension to be studied and delivering it into a measurement cell, of arresting such delivery when the suspension reaches a set level in said cell, of stopping the agitation process, of measuring the settling time between two given levels in said cell of the interface (referred to hereafter as settling face) which forms in the body of the suspension at rest in the cell between the suspended precipitate undergoing settlement and the liquid floating on the surface, and of discharging this suspension from said cell.

Thus, by periodically measuring in accordance with the present invention, the rate of settlement of the precipitate, notably in cases of continuous production of a substance by precipitation, is is possible to detect fluctuations in the operation of the reaction, and accordingly, to adjust the different reaction parameters so as to maintain the physico-chemical properties of the precipitate within narrow limits.

The invention further relates to a device for performing the above mentioned method, which device includes a settlement cell equipped with stirring means and capable of being supplied with a suspension liquid, means for sensing the filling limit that are capable of arresting said supply and of arresting the stirring process when the suspension liquid has reached a set level at the top of the cell, means for detecting the passage of the settling face of the precipitate, within the suspension liquid at rest, to an upper level and to a lower level in said cell, a device operated by said detecting means for measuring the time taken by the settling face to move from said upper level to said lower level, and a control unit controlled by said means for sensing the end of filling and by said detection means to periodically initiate the filling process, and, after said measurements have been effected, empty said cell.

The description which follows with reference to the accompanying non-limitative exemplary drawing will give a clear understanding of how the invention can be carried into practice.

The single figure in the accompanying drawing is a schematic part-sectional view of the main components of a preferred embodiment of the subject device of the present invention.

It being assumed that it is desired to control the rates of settlement of a product precipitated in a liquid medium, in a continuously operated installation, the invention may be carried out as follows.

With a continuous production installation as shown diagrammatically in the accompanying drawing in the form of a reactor 1, the rate of settlement of the precipitate formed during the chemical reaction is controlled by periodically performing a cycle of operations which includes the successive steps of drawing off part of the suspension formed in the reactor and, via a conduit 2 controlled by a valve 3, delivering it into a settlement cell 4 under stirring, of arresting such delivery and stirring when the suspension delivered has reached a set level in the upper part of said cell, of measuring the time taken by the settling face which forms within the mass contained in cell 4 to move between said set upper and lower levels in said cell, of discharging the suspension preferably through a conduit 5 controlled by a valve 6 and communicating with the bottom of cell 4, prior to the delivery of a fresh charge of suspension liquid into said cell during the next cycle.

Valve 3 is preferably a three-way valve provided within a conduit 7 for continuously discharging the suspension from reactor 1. The conduit 5 for discharging the suspension from column 4 is preferably connected, downstream of valve 6, to discharge conduit 7. Thus the column 4 and its supply and discharge conduits 2 and 5 bypass the conduit for ensuring continuous discharge from reactor 1, the valves 3 and 6 respectively permitting periodic offtakes of part of the suspension formed in the reactor and discharge, subsequent to a measurement, of this part through the discharge conduit once more.

Settlement cell 4 is preferably a transparent glass column retained between two supporting flanges 8 and 9, the column being surmounted by an overflow vessel 11, with drainage taking place through a pipe member 12 connected to discharge conduit 7 in order to avoid possible overflowing.

To fix ideas, said column could consist for instance of a glass tube 50 millimeters in diameter and 300 millimeters tall, the lower level being located 100 millimeters from the upper level.

The stirring effect provided during filling of the cell is obtained by means of a reciprocating stirrer 13 driven by a motor 14 and the stirring rate of which is adjustable.

The sensor capable of shutting off the supply to column 4 when the suspension reaches the set end-of-filling level is preferably formed by a level-electrode shown diagrammatically at 15 and capable of furnishing a signal which is used to reverse the three-way valve 3.

The said upper and lower level detecting means each preferably comprise a projector 17 capable of producing a horizontal beam of light passing through column 4 and thereby revealing the corresponding level, and a photoelectric cell 18 positioned opposite said projector, on the other side of column 4 for producing a signal that detects the precise moment at which the settling face moves past the level in question. The time taken by the settling face to move from the upper level to the lower level is preferably measured by an electronic chronometer 19 possibly cooperating with an electronic recorder 20 of conventional design for providing a recording graph which may be graduated directly in settling-rate units.

In the form of embodiment of the apparatus shown in the accompanying drawing, the said upper level is the same as the set end-of-filling level, with only one projector 17-photoelectric cell 18 system being then necessary (to detect the lower level used for the measurement). As well as controlling reversing of electromagnetic valve 3, the level-electrode 15 will then also control starting of the cvhronometer 19, the latter being arrested by photoelectric cell 18 when the settling face reaches its level. The elapsed time can then be recorded by a conventional recorder 20 which, when this time falls outside predetermined time limits, is capable of delivering a signal which can be used by a warning device or, in some instances, by one of the component parts of the production installation capable of modifying the conditions of precipitation within reactor 1 to restore the settlement times measured during subsequent cycles within said time limits.

Obviously, in the device previously described, the settlement height can readily be adjusted by shifting the level-electrode 14 or the projector 17-photoelectric cell 18 system for detecting the lower level.

The control system which coordinates the periodic operations can be devised in any convenient manner suited to the performance of a program of cyclic operations. Recourse may be had for instance to the control circuit to be described hereinafter for non-limitative exemplary purposes, which circuit includes a central control unit 21 which comprises two inputs 22, 23 respectively connected to the outputs of level-electrode 15 and photoelectric cell 18 respectively, and outputs respectively connected to inputs 26, 27, 28, 29 and 30 of electrically operated valve 6, projector 17, electrically operated valve 3, motor 14 of stirrer 13 and electronic chronometer 19, respectively.

The central control unit may consist of any device well known per se capable of delivering at its outputs successive signals according to a program which is incorporated therein and the successive sequences of which are triggered automatically, possibly through the agency of time-delay cells forming part of the unit, responsive to signals applied to its inputs to perform the successive operations involved in the cycle, under the following conditions for example.

Following its activation, for instance through closure of an external feed circuit (not shown), the unit 21 controls:

At time $t_0$, by applying signals to their respective inputs 29 and 26, starting of stirrer 13 and opening of valve 6, thus permitting discharge of the possible contents of column 4 through conduit 6;

At time $t_1$, following a time interval $\Delta t_1$ determined by a time-delay cell (not shown) of unit 21, the opening, by applying a signal to its input 28, of electrically operated valve 3 which then causes at least part of the suspension which would normally flow through conduit 7 to be by-passed into column 4, which is thus rinsed;

Then at time $t_2$, after a time interval $\Delta t_2$ likewise predetermined by a time-delay cell (not shown) of unit 21, the closure, by suppressing the signal applied to its input 26, of valve 6 which then allows column 4 to be filled until the suspension reaches the level-electrode, which electrode then applies a pulse to the input 22 of the control unit.

At a time instant $t_3$, this last pulse triggers the remainder of the program applied by unit 21, which unit simultaneously controls:

Reversing of valve 3 which shuts off the bypass flow of suspension through conduit 2 and stops the stirrer motor 14, by eliminating the signals applied to their respective inputs 28 and 29;

Switching on of projector 17 and starting of electronic chronometer 19, by applying control pulses to their respective inputs 27 and 30.

The electronic chronometer is stopped only when the signal applied to its input 30 by control unit 21 is cut off following the reception, at a time $t_4$, of a pulse furnished by photoelectric cell 18 to control unit input 23 when the settling face reaches its level.

At the same instant $t_4$ the unit 21 also causes:

Extinction of projector 17 by suppressing the corresponding signal on its input 27, and Starting of the stirrer motor and reversal of valve 6 in order to empty the contents of column 4, this being effected by applying control signals to their respective inputs 29 and 26. The cycle of operations then recommences.

The time measured during each cycle by electronic chronometer 19 can then be recorded by a recorder 20 which, when the time measured during successive cycles falls outside the permissible limits, is capable of delivering a signal to a warning device 31 which is operated if, for instance, the time separating two successive measures extend beyond a predetermined value, or if the settling time measured is abnormally high.

There is thus obtained an apparatus whose use is remarkably simple and efficient, and which, in the case of a continuous production of a precipitate, may be adapted to automatically adjust one of the parameters capable of influencing the course of the reaction in reactor 1, an example being a control member (not shown) for adjusting the inflow of one of the reactants required for the reaction, the pH value, the temperature, or some other parameter, to restore the rate of settlement of the precipitate to a value falling between said permissible limits.

An installation as previously disclosed would be equally adaptable for the reverse operation, that is to say, for studing the influence of the different parameters of a reaction on the rate of settlement of the product formed.

It goes without saying that many changes and substitutions of parts may be made in the specific embodiments hereinbefore described without departing from the spirit or scope of the invention.

What we claim is:

1. A method of automatically surveying the rate of settlement of a precipitate in the liquid medium of a continuously formed flow of suspension which comprises periodically by-passing, responsive to a signal, part of this suspension through a measurement cell under the effect of gravity and under agitation, said signal triggering, after a predetermined time delay, a sequence of operations which comprises closing the measurement cell in its bottom, arresting the by-passing of the suspension when the same reaches a set level in said cell, stopping the agitation, measuring the settlement time, between two set levels within said cell, of the settling face which forms within the body of the suspension at rest in the cell, and reopening the cell bottom for discharging the suspension from the cell, which reopening controls, after a pre-set time delay, the production of said signal.

2. A method according to claim 1, wherein the suspension discharged from the measurement cell is returned to said flow of suspension.

3. A process according to claim 1, which comprises directing a light beam through said measurement cell at at least one said predetermined set level used for the measurement of said settlement time and on a photoelectric cell, and causing the photoelectric cell to produce a signal at the time the settling face passes at said at least one set level.

4. A method according to claim 3, wherein the said set level which causes arresting of said introduction process coincides with the higher of the two said set levels from which measurement of the settlement time begins.

5. A method according to claim 4 wherein the arresting of the introduction of suspension into the cell in said sequence of operations coincides with stoppage of agitation.

6. Apparatus for the continuous chemical production of a precipitate in a liquid medium comprising a reactor, a conduit for discharging the suspension formed in said reactor, bypass means connected to said discharge conduit through first and second valve means respectively, a cell provided within said bypass means, sensing means capable of producing a first signal when the suspension has reached a set level in the upper part of the cell, means for detecting the passage of the settling face of the precipitate within the suspension at rest to an upper level and to a lower level in said cell, and for producing, in the last instance, a second signal, means operative by said detection means for measuring the time taken by said settling face from said upper level to said lower level and a control unit operative by said first and second signals to periodically actuate said first and second valve means so as to periodically initiate the filling process and, subsequent to said time measurements, the emptying of said cell.

7. A device according to claim 6, wherein said end-of-filling sensing means are formed by a level-electrode.

8. A device according to claim 6, wherein the said end-of-filling sensing means likewise form the detecting means associated to said upper level.

9. A device according to claim 6, wherein said cell is a transparent column.

10. A device according to claim 9, wherein at least one of said detection means comprises a projector capable of producing a horizontal light beam traversing said column, and a photoelectric cell positioned opposite said projector on the other side of said transparent column, for generating a signal when said settling face reaches its level.

References Cited

UNITED STATES PATENTS

| | | | |
|---|---|---|---|
| 2,379,158 | 6/1945 | Kalischer | 23—253 X |
| 2,955,459 | 10/1960 | Cihelka et al. | 73—57 |
| 3,279,305 | 10/1966 | Muta et al. | 73—61 X |

MORRIS O. WOLK, Primary Examiner

R. E. SERWIN, Assistant Examiner

U.S. Cl. X.R.

23—253; 73—53, 57, 61; 210—42